United States Patent [19]

Damon

[11] Patent Number: 5,190,773
[45] Date of Patent: Mar. 2, 1993

[54] MOLD FOR FABRICATING COMPOSITE ARTICLES HAVING INTEGRALLY BONDED STIFFENING MEMBERS

[75] Inventor: Christopher J. Damon, Cheshire, Conn.

[73] Assignee: United Technologies Corporation, Hartford, Conn.

[21] Appl. No.: 793,901

[22] Filed: Nov. 18, 1991

[51] Int. Cl.$^5$ .................... B29C 35/02; B29C 43/36
[52] U.S. Cl. ................. 425/186; 425/195; 425/394; 425/417; 425/441; 425/DIG. 44; 156/232; 156/244.27; 156/245; 156/500; 249/134
[58] Field of Search ............ 249/65, 82, 83, 134, 249/135, 160, 161, 162; 425/127, 128, 195, 330, 389, 394, 411, 417, 441, DIG. 14, DIG. 44, DIG. 112, 193, 186; 156/242, 232, 244.27, 245, 500

[56] References Cited

U.S. PATENT DOCUMENTS

| | | | |
|---|---|---|---|
| 4,041,010 | 8/1977 | Jeram | 260/42.26 |
| 4,388,263 | 6/1983 | Prunty | 425/DIG. 44 |
| 4,492,607 | 1/1985 | Halcomb | 156/242 |
| 4,564,662 | 1/1986 | Albin | 526/247 |
| 4,702,870 | 10/1987 | Setterholm et al. | 425/DIG. 44 |
| 4,956,419 | 5/1990 | Kolb et al. | 525/342 |

Primary Examiner—Jay H. Woo
Assistant Examiner—Khanh P. Nguyen
Attorney, Agent, or Firm—Terrance J. Radke

[57] ABSTRACT

A composite mold that facilitates the fabrication, in a single curing step, of composite articles having opposing sets of stiffening members disposed in combination with a main structural panel. The composite mold provides for simultaneous co-curing of the opposed stiffening members in combination with the main structural panel. The composite mold includes a rigid mold assembly and a "T" mold assembly, which, in combination, define a rigid lay-up surface for the prepreg laminates forming the main structural panel. The rigid mold assembly includes rigid members that act as reactive surfaces for cure pressures, and removable end and wedge members for assembling/disassembling of the rigid mold assembly, "T" mold assembly combination. The "T" mold assembly is operative during the cure process to generate the pressure required to cure the legs of one set of the stiffening members. The "T" mold assembly includes complementary first and second pressure blocks that define the configuration of the one set of stiffening members. At least one of the complementary pressure blocks has a thermally expansible material encapsulated therein that is operative, in response to elevated temperatures experienced during the cure process, to expand, causing the complementary pressure blocks to exert the pressure necessary to cure the legs of the one set of the stiffening members.

7 Claims, 3 Drawing Sheets

MOLD FOR FABRICATING COMPOSITE ARTICLES HAVING INTEGRALLY BONDED STIFFENING MEMBERS

TECHNICAL FIELD

The present invention is directed to composite manufacturing techniques, and more particularly, to a mold that facilitates co-curing of composite stiffening members to one or both composite skin surfaces with the simultaneous curing of the composite skin.

BACKGROUND OF THE INVENTION

Many composite articles, for example, composite structural panels such as the center shear deck of a helicopter, require stiffening members to enhance the structural strength of the main structural panel. To ensure that such composite articles are functional for their intended purpose, the stiffening members must be rigidly secured to the main structural panel. In addition, the composite manufacturing technique must produce composite articles having smooth surface finishes, i.e., the fabrication technique must not induce distortions or defects in the skin surfaces of the main structural panel or the stiffening members.

Composite structural articles having stiffening members have been fabricated, where possible, so that the stiffening members are all disposed on only one side of the main panel. This technique greatly simplifies the manufacturing process and ensures the suitability of the finished composite articles. Any one of several techniques may be utilized to form composite articles having stiffening members disposed on only one side of the main structural panel. Prepreg laminates comprising the main structural panel may be layed-up on a rigid mold, which provides the required surface finish for the main structural panel. The prepreg plies comprising the stiffening members may be layed-up on the prepreg laminates and maintained in place by means of a preformed mold, a semi-rigid membrane, or mandrels and a vacuum bag. The assembled mold may be placed in an autoclave and subjected to a cure process wherein the stiffening members are simultaneously integrally bonded and co-cured in combination with the main structural panel. The preformed mold, the semi-rigid membrane, or the mandrels provide the required surface finish for the stiffening members. A more detailed description of the fabrication technique utilizing a preformed mold may be had by reference to U.S. Pat. No. 4,492,607.

While the foregoing fabrication techniques are suitable for the fabrication of composite articles having stiffening members disposed on only one major surface of the main structural panel, a problem arises when stiffening members are required on both major surfaces of the composite article. One fabrication technique for composite articles having opposed stiffening members involves the fabrication of a composite article having stiffening members on one major surface as described in the preceding paragraph. Precured stiffeners may then be secured to the other major surface by drilling holes through the corresponding skin of the main structural panel and utilizing composite fasteners to secure the precured stiffeners to the surface thereof. In addition to the additional cost and time involved in the labor intensive securing operation, a serious deficiency with this technique is that stress concentrations are introduced in the composite article at the stiffening member securement sites.

Another fabrication technique for producing composite articles having opposed stiffening members involves the fabrication of a composite article having stiffening members on one major surface as described hereinabove. Precured stiffening members are then attached to the other major surface using a thermoset adhesive, and placing the assembled composite article in an autoclave to cure the thermoset adhesives. One problem with this method is that the secondary bonding process produces weaker composite articles as compared to integrally bonded or co-cured composite articles. In addition, the additional manufacturing steps increase the cost of such composite articles, cost being directly proportional to the number of manufacturing operations and cure cycles necessary to produce the finished composite article.

A need exists for a fabrication technique and molding apparatus for forming composite articles having opposed stiffening members integrally bonded to the main structural panel. The fabrication technique/molding apparatus should provide for simultaneous co-curing of the opposed stiffening members with the main structural panel to form the composite article.

SUMMARY OF THE INVENTION

One object of the present invention is to provide a mold for fabricating composite articles having integrally bonded stiffening members.

Another object of the present invention is to provide a mold that facilitates the fabrication of composite articles having integrally bonded, opposed stiffening members.

Still another object of the present invention is to provide a mold that provides simultaneous co-curing of opposed stiffening members with the main structural panel of the composite article.

Yet another object of the present invention is to provide a mold that includes a means for generating an internal pressure for curing one set of the opposed stiffening members.

These and other objects of the present invention are provided by a composite mold that facilitates the fabrication of a composite article having opposing sets of "T" stiffening members in a single curing step, thereby reducing the overall manufacturing costs associated with the fabrication of such composite articles. In addition, the composite mold of the present invention allows the opposing sets of "T" stiffening members to be simultaneously, integrally bonded to respective major surfaces of the main structural panel, thereby providing a finished composite article of increased structural strength. The composite mold of the present invention is configured for use with prepreg plies and laminates.

The composite mold comprises a mold base, a rigid mold assembly and a "T" mold assembly. The rigid mold assembly and the "T" mold assembly in combination define a rigid lay-up surface for the prepreg laminates comprising the main structural panel of the composite article to be fabricated.

The mold assembly includes rigid members, removable end members, and removable wedge members. The rigid members are rigidly secured to the mold base and function as reactive surfaces for the pressures generated during the cure process to ensure proper curing of the legs of one set of the "T" stiffening members. The end members and the wedge members are configured to facilitate assemblage of the layed-up "T" mold assembly in combination with the rigid members to form the composite mold for lay-up of the prepreg laminates and subsequent cure operations. The end members and the wedge members also facilitate the disassembly of the composite mold for removal of the finished composite article.

The composition and configuration of the "T" mold assembly is crucial to the proper functioning of the composite mold of the present invention. The configuration and composition of the "T" mold assembly is operative, during the cure process, to generate the pressure required to ensure proper fabrication of the legs of one set of "T" stiffening members. The configuration of the "T" mold assembly facilitates lay-up of the prepreg plies comprising one set of "T" stiffening members and integral bonding of such "T" stiffening members to the corresponding major surface of the main structural panel. The configuration and composition of the "T" mold assembly also ensures that respective surfaces of the finished composite article, in particular the "T" stiffening members, are smooth, i.e., no distortion of or surface defects induced in the prepreg plies or laminates during the cure process.

The "T" mold assembly comprises first and second pressure blocks that function as complements to define the configuration of the "T" stiffening member. Each pressure block includes a forming face. During the cure process, the forming face is biased into engagement with and exerts pressure against the corresponding leg surface of the "T" stiffening member. The forming face is fabricated to have a planar surface such that the corresponding leg of the "T" stiffening member is smooth, i.e., free from surface defects or distortions.

Each pressure block further includes a stepped shoulder that accommodates the prepreg plies comprising the respective flange of the corresponding "T" stiffening member. The stepped shoulder is also fabricated to have a planar surface so that the respective flange of the "T" stiffening member is smooth.

A first embodiment of the "T" mold assembly has a pressure cavity formed in each pressure block in opposed relation to the corresponding forming face such that the "T" mold assembly is operative, through the complementary first and second pressure blocks, to exert opposed cure pressures against stiffening member. In a second embodiment of the "T" mold assembly, in contrast, only one of the complementary pressure blocks has a pressure cavity such that the "T" mold assembly is operative, through the single pressure block, to exert a cure pressure against one leg surface of the corresponding "T" stiffening member. The other pressure block functions as a reactive surface for the pressure exerted by the single pressure block.

The respective pressure cavities of the pressure blocks are sized to provide the requisite cure pressure for the corresponding leg of the "T" stiffening member. Sizing constraints that define the dimensions of the pressure cavities include the characteristics of the prepreg plies forming the "T" stiffening member, the configuration of the "T" mold assembly, i.e., the number of pressure blocks exerting a cure pressure against the leg of the "T" stiffening member, and the characteristics of the thermally expansible material disposed within the pressure cavities.

A thermally expansible material is encapsulated within the pressure cavity to define a pressure pad. The pressure pad is operative, in response to the elevated temperatures experienced during the cure process, to expand, which causes the corresponding pressure block to exert a predetermined pressure (via the respective forming face) against the corresponding leg of the "T" stiffening member. Encapsulating the pressure pad within the pressure cavity protects the pressure pad from contact with the thermosetting resin of the prepreg plies/laminates.

Prepreg plies are layed-up in combination with the complementary pressure blocks to form tee respective "T" stiffening members of the composite article. The removable end blocks and the removable wedges are then inserted in combination with the "T" mold assembly and the rigid members to form the composite mold. Prepreg laminates are then layed-up on the rigid lay-up surface of the composite mold to define the main structural panel of the composite article. The layed-up prepreg laminates contact the prepreg plies forming the flanges of the "T" stiffening members such that during the cure process, the "T" stiffening members integrally bond in combination with the main structural panel. The layed-up composite mold as described in the preceding paragraph may be utilized to form a composite article having "T" stiffening members integrally bonded to both major surfaces of the major structural panel or a composite article having "T" stiffening members bonded to only one major surface of the main structural panel. To fabricate a composite article having opposed sets of "T" stiffening members, additional prepreg plies are layed-up, on the exposed surface of the prepreg laminates of the composite mold, to form the opposed set of "T" stiffening members. Either form of the assembled composite mold is placed in an autoclave for curing.

The composite mold of the present invention is not limited to the production of composite articles having "T" shaped stiffening members. To fabricate composite articles having stiffening members of other configurations, the "T" mold assembly is modified as required, by fabricating appropriately shaped complementary pressure blocks having pressure pads as required, to conform to the desired configuration of the stiffening members.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

Figure 1:
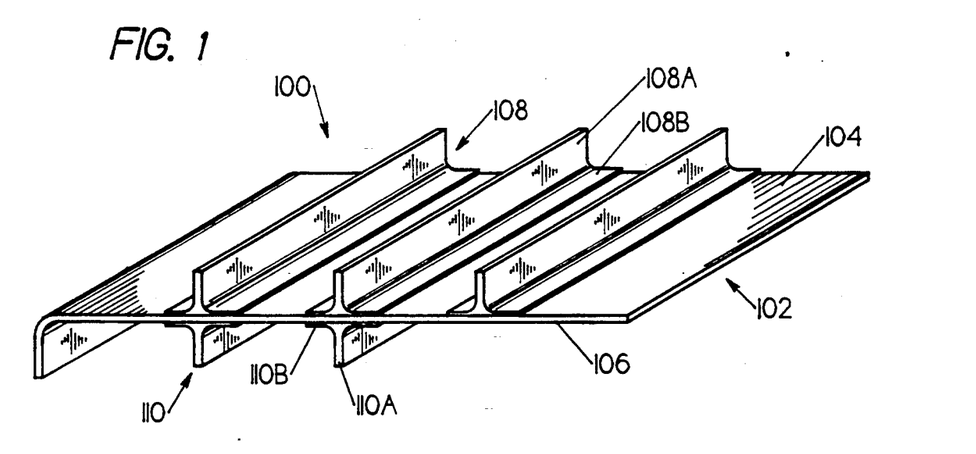
FIG. 1 illustrates a composite article having opposing "T" stiffening members integrally bonded to a main panel.
Figure 2:
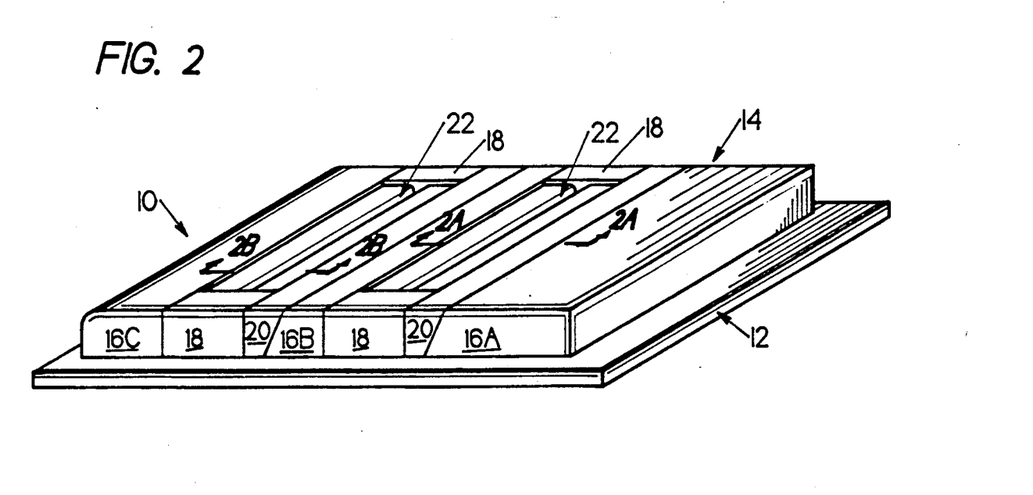
FIG. 2 illustrates an exemplary composite mold according to the present invention.

Referring now to the drawings where like reference numerals indicate corresponding or similar elements throughout the several views, FIG. 1 is a representative example of one configuration of a composite article that may be fabricated utilizing a composite mold 10 according to the present invention, as illustrated in FIG. 2. The composite article 100 illustrated is a composite structural panel 102 having upper and lower major surfaces 104, 106, respectively. Integrally bonded to the upper and lower major surfaces 104, 106 are sets of composite "T" stiffening members 108, 11?, respectively. Each "T" stiffening member 108, 110 includes a leg portion 108A, 110A and opposed flange portions 108B, 110B. The composite mold 10 of the present invention also has utility in fabricating composite articles having "T" stiffening members integrally bonded to only one major surface of the structural panel (e.g., "T" stiffening members 108 or 110).

The composite mold 10 of the present invention is configured to use prepreg plies and laminates. Prepreg plies/laminates are formed by impregnating a fibrous matrix such as fibrous cloth, fibrous yarn tapes, fiber tow, etc., formed of graphite, boron, glass, polyimides (e.g., Kevlar) or similar fibrous materials, with a predetermined amount of resinous material such as epoxy, polymeric, phenolic, or other similar thermosetting organic resinous materials. The impregnated matrix is staged and dried to form a partially cured ("tacky") prepreg ply/laminate. Prepreg plies and laminates are layed-up in the composite mold 10, as discussed in further detail hereinbelow, to form the "T" stiffening members and the main structural panel, respectively.

The composite mold 10 of the present invention, as discussed in subsequent paragraphs, facilitates the fabrication of the composite article 100 having opposing sets (upper and lower) of "T" stiffening members 108, 110 in a single curing step, thereby reducing the overall manufacturing costs associated with the fabrication of such composite articles. In addition, the composite mold 10 allows opposing sets of "T" stiffening members 108, 110 to be simultaneously, integrally bonded to respective major surfaces 104, 106 of the main structural panel 102, thereby providing a finished composite article 100 of increased structural strength.

Figure 2A:
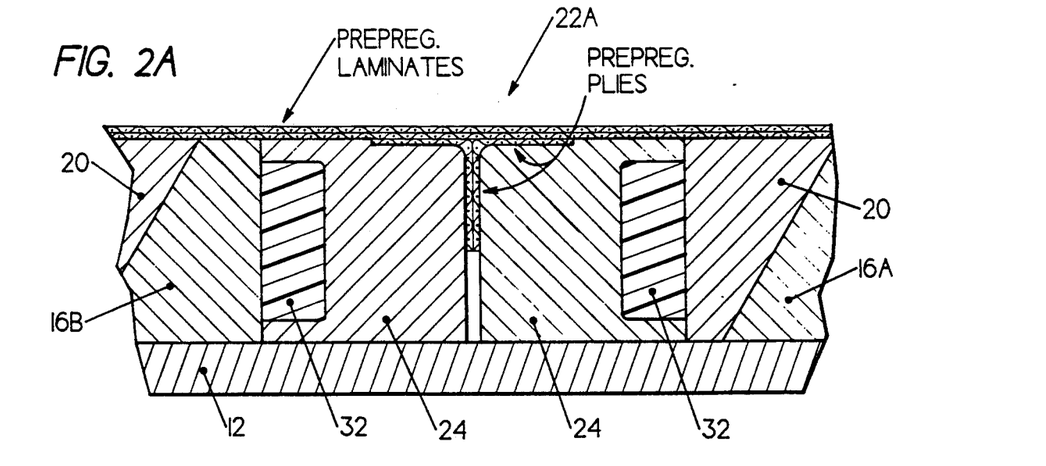
FIG. 2A is a cross-sectional view of the composite mold of FIG. 2 along line A—A illustrating one embodiment of a "T" mold assembly according to the present invention.
Figure 2B:
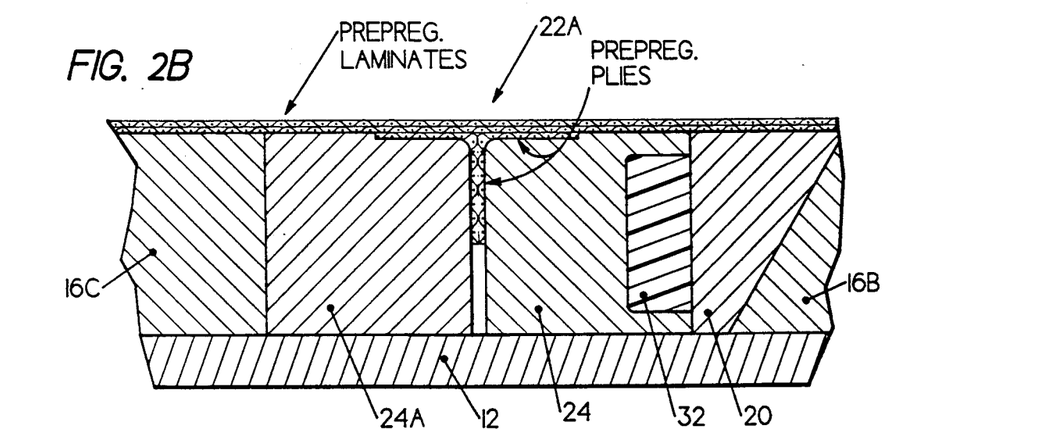
FIG. 2B is a cross-sectional view of the composite mold of FIG. 2 along line B—B illustrating another embodiment of a "T" mold assembly according to present invention.

An exemplary composite mold 10 according to the present invention is illustrated in FIGS. 2, 2A, 2B. The composite mold 10 comprises a mold base 12, a rigid mold assembly 14 and a "T" mold assembly 22. The mold base 12 is configured for attachment of a vacuum bag or a semi-rigid membrane, in a manner known to those skilled in the art, so that the composite mold 10 may be utilized in an autoclave. The rigid mold assembly 14 and the "T" mold surface for the prepreg laminates comprising the main structural panel of the composite article.

The rigid mold assembly 14 is fabricated from a hard, durable material such as steel to provide part of the rigid surface for lay-up of the prepreg laminates comprising the main structural panel. The mold assembly 14 includes rigid members 16A, 16B, 16C, removable end members 18, and removable wedge members 20. The members 16A, 16B, 16C are rigidly secured to the mold base 12 and function as reactive surfaces for the pressures generated during the cure process to ensure proper curing of the legs of one set of the "T" stiffening members, as discussed hereinbelow in further detail.

The end members 18 and the wedge members 20 are configured to facilitate assemblage of the layed-up "T" mold assembly 22 in combination with the rigid members 16A, 16B, 16C to form the composite mold 10 for lay-up of the prepreg laminates and subsequent cure operations. The end members 18 and the wedge members 20 also facilitate the disassembly of the composite mold 10 for removal of the finished composite article.

The composition and configuration of the "T" mold assembly 22 is crucial to the proper functioning of the composite mold 10 of the present invention. The configuration and composition of the "T" mold assembly 22 is operative, during the cure process, to generate the pressure required to ensure proper fabrication of the legs of one set of "T" stiffening members (e.g., "T" stiffening members 110). The configuration of the "T" mold assembly 22 facilitates lay-up of the prepreg plies comprising one set of "T" stiffening members and integral bonding of such "T" stiffening members to the corresponding major surface of the main structural panel. The configuration and composition of the "T" mold assembly 22 also ensures that respective surfaces of the finished composite article, in particular the "T" stiffening members, are smooth, i.e., no distortion of or surface defects induced in the prepreg plies or laminates during the cure process.

Figure 3A:
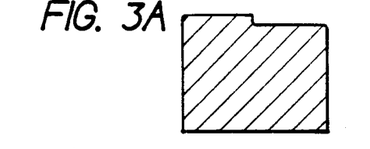
FIGS. 3A, 3B, 3C and 3D illustrate evaluated configurations for pressure blocks for the "T" mold assembly of the present invention.

The inventor has examined a number of compositions/configurations for the "T" mold assembly to determine an optimal composition and configuration for the "T" mold assembly. FIG. 3A illustrates a machined aluminum block that functions as the "T" mold assembly. The aluminum block expands, when subjected to the elevated temperatures of the cure process, to exert pressure on abutting prepreg lay-ups. Aluminum is easily machined to the proper configuration, and is durable at the elevated temperatures and pressures experienced during the cure process. Aluminum, however, has a coefficient of thermal expansion almost twice as great as steel ($12.44 \times 10^{-6}$ in/in/°F. versus $6.33 \times 10^{-6}$ in/in/°F.), which poses the possibility of distortion of the prepreg plies comprising the "T" stiffening member cure process.

Figure 3B:
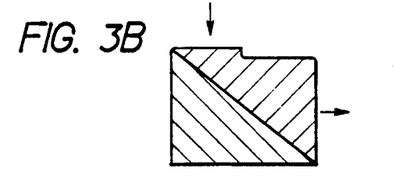

FIG. 3B illustrates a two-piece steel block that functions as the "T" mold assembly. The upper wedge of the two-piece steel block slides relative to the lower wedge, in response to cure pressure exerted through the prepreg laminates comprising the main structural panel, to exert side pressure against the prepreg plies comprising the leg surface of the "T" stiffening member. The two-piece steel block, however, is expensive to fabricate, and the magnitude of the exerted side pressure is difficult to predict and/or control.

Figure 3C:
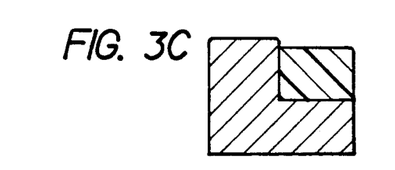

FIG. 3C illustrates one embodiment of a "T" mold assembly that comprises a molded silicone plug bonded to a steel block. The silicone plug expands as a result of the elevated temperatures of the cure process, at a greater rate than the steel block, to exert direct contact pressure against the prepreg plies comprising the respective flange and leg surface of the "T" stiffening member. The steel block is relatively easy to fabricate, and the silicone plug is readily molded to shape for bonding to the steel block. Silicone rubber, however, is adversely affected by the thermosetting resin of the prepreg plies, and must be periodically reworked and/or replaced.

Figure 3D:
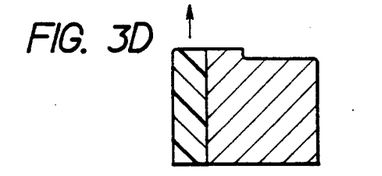

FIG. 3D illustrates another embodiment of a "T" mold assembly that comprises a molded silicone plug bonded to a steel block. In this embodiment, the cure pressure generated by the silicone plug is exerted indirectly against the prepreg plies comprising the respective flange and leg surface of the "T" stiffening member through the steel block. The silicone plug, however, may freely expand into the prepreg laminate comprising the main structural panel to cause distortion thereof.

Optimal embodiments of the "T" mold assembly 22 for fabricating composite articles that include "T" stiffening members are exemplarily illustrated in FIGS. 2A, 2B. A first embodiment of a "T" mold assembly 22A for the composite mold 10 of the present invention is illustrated in FIG. 2A. A second embodiment of a "T" mold assembly 22B for the composite mold 10 is illustrated in FIG. 2B. Each embodiment comprises first and second pressure blocks 24 that function as complements to define the configuration of the "T" stiffening member. Each pressure block 24 is preferably fabricated from the same hard, durable material as the rigid mold assembly 14. Steel is typically utilized.

Figure 4:
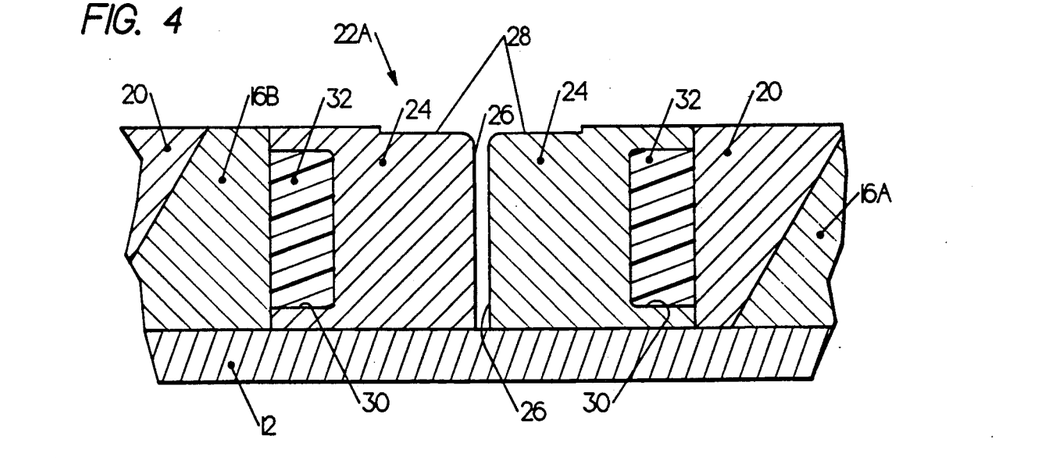
FIG. 4 illustrates the configuration of the pressure block for the "T" mold assembly of the present invention.

Referring to FIG. 4, each pressure block 24 includes a forming face 26. During the cure process, the forming face 26 is biased into engagement with and exerts pressure against the corresponding leg surface of the "T" stiffening member. The forming face 26 is fabricated to have a planar surface such that the corresponding leg of the "T" stiffening member is smooth, i.e., free from surface defects or distortions.

Each pressure block 24 further includes a stepped shoulder 28. The stepped shoulder 28 accommodates the prepreg plies comprising the respective flange of the corresponding "T" stiffening member. The stepped shoulder 28 is also fabricated to have a planar surface so that the respective flange of the "T" stiffening member is smooth.

Each pressure block 24 of the "T" mold assembly 22A embodiment of FIG. 2A has a pressure cavity 30 formed therein in opposed relation to the corresponding forming face 26. Accordingly, the "T" mold assembly 22A is operative, through the complementary first and second pressure blocks 24, to exert opposed cure pressures against respective leg surfaces of the corresponding "T" stiffening member. In contrast, only one pressure block 24 of the "T" mold assembly 22B embodiment of FIG. 2B has a pressure cavity 30, the other pressure block 24A being solid. Thus, the "T" mold assembly 22B is operative, through the single pressure block 24, to exert a cure pressure against one leg surface of the corresponding "T" stiffening member. The other pressure block 24A functions as a reactive surface for the pressure exerted by the single pressure block 24.

The respective pressure cavities 30 of the pressure blocks 24 are sized to provide the requisite cure pressure for the corresponding leg of the "T" stiffening member. Sizing constraints that define the dimensions of the pressure cavities 30 include the characteristics of the prepreg plies forming the "T" stiffening member, the configuration of the "T" mold assembly 22, i.e., the number of pressure blocks 24 exerting a cure pressure against the leg of the "T" stiffening member, and the characteristics of the thermally expansible material disposed within the pressure cavities 30.

A thermally expansible material is encapsulated within the pressure cavity 30 to define a pressure pad 32. The pressure pad 32 is operative, in response to the elevated temperatures experienced during the cure process, to expand in volume, which causes the corresponding pressure block 24 to exert a predetermined pressure (via the respective forming face 26) against the corresponding leg of the "T" stiffening member. By encapsulating the pressure pad 32 within the pressure cavity 30, the pressure pad 32 is protected from contact with the thermosetting resin of the prepreg plies/laminates.

Many expansible materials may be used to form the pressure pad 32. The expansible material should have a coefficient of thermal expansion greater than the hard, durable material comprising the rigid mold assembly 14 and the pressure blocks 24. In addition, the expansible material should undergo sufficient volume expansion at the elevated temperatures of the cure process to generate the predetermined pressure described in the preceding paragraph. Room temperature vulcanization (RTV) compounds are materials having particular utility in forming the pressure pad(s) 32 of the composite mold 10.

Aircast 3700 (Airtech International, Inc., Carson, Calif.) is a representative example of an RTV compound having utility in the present invention. This RTV compound is a two component compound comprising a base and a curing agent. The base and curing agent are mixed together, poured into the pressure cavity 30, and cured at room temperature to form the pressure pad 32. Aircast 3700 has a coefficient of thermal expansion of about $10.5 \times 10^{-5}$ in/in/°F. (as compared to the coefficient of thermal expansion of steel, $6.33 \times 10^{-6}$ in/in/°F.).

Fluoroelastomers such as Fluorel TM (3M Company, St. Paul, Minn.), (E. I. du Pont de Nemours Corp., Wilmington, Del.), and other elastomers such as halogenated elastomers, fluorosilicone elastomers, and fluorophophazene elastomers that have a coefficient of thermal expansion (at the elevated cure temperatures) greater than the material comprising the pressure blocks 24 may also be utilized to form (under heat and pressure) the pressure pads 32 for the composite mold 10. Other materials such as silicone rubber may also be utilized to form the pressure pads 32 for the pressure blocks 24.

The fabrication protocols for utilization of the composite mold 10 of the present invention are set forth in the following paragraphs. Prepreg plies are layed-up in combination with the complementary pressure blocks 24 to form the respective "T" stiffening members of the composite article. The removable end blocks 18 and the removable wedges 20 are then inserted in combination with the "T" mold assembly 22 and the rigid members 16A, 16B, 16C to form the composite mold 10. Prepreg laminates are then layed-up on the rigid lay-up surface of the composite mold 10 to define the main structural panel of the composite article (see FIG. 2A). The layed-up prepreg laminates contact the prepreg plies forming the flanges of the "T" stiffening members such that during the cure process, the "T" stiffening members integrally bond in combination with the main structural panel.

The layed-up composite mold 10 as described in the preceding paragraph may be utilized to form a composite article having "T" stiffening members integrally bonded to both major surfaces of the major structural panel or a composite article having "T" stiffening members bonded to only one major surface of the main structural panel. To fabricate a composite article having opposed sets of "T" stiffening members, conventional fabrication apparatus such as a semi-rigid membrane or mandrels and a nylon vacuum bag are utilized in combination with the layed-up composite mold 10.

Additional prepreg plies are layed-up, on the exposed surface of the prepreg laminates of the composite mold 10, to form the opposed set of "T" stiffening members. Maintenance of the position of the additional prepreg plies in combination with the composite mold 10 is achieved by means of the semi-rigid membrane, which is secured to the mold base 12. Alternatively, the combination of the mandrels and the nylon vacuum bag may be utilized to maintain the position of the additional prepreg plies. The assembled composite mold 10 is placed in an autoclave for curing. The pressure generated in the autoclave during the cure process is exerted through the semi-rigid membrane/vacuum bag against the prepreg laminates comprising the main structural member for cure thereof. Such pressure also causes integral bonding of the opposed "T" stiffening members in combination with the main structural panel.

The stepped shoulders 24 of the complementary pressure blocks 28 act as reactive surfaces with respect to such pressure for integral bonding of one set of "T" stiffening members in combination with the main structural member. Autoclave pressure is exerted through the semi-rigid membrane/mandrels to integrally bond the other set of "T" stiffening members to the main structural panel. In addition, the autoclave pressure exerted through the semi-rigid membrane/mandrels also facilitates curing of the legs of the other set of "T" stiffening members. Simultaneously, the elevated temperatures of the cure process cause expansion of the pressure pad(s) 32 so that cure pressure is exerted against the legs of the one set of "T" stiffening members (via the forming faces 26 of the complementary pressure blocks 24) for cure thereof.

To fabricate a composite article having only one set of "T" stiffening members, the layed-up composite mold 10 is vacuum bagged and placed in an autoclave for curing. The pressure generated in the autoclave during the cure process is exerted through the vacuum bag against the prepreg laminates comprising the main structural member for cure thereof. Such pressure also causes integral bonding of the "T" stiffening members in combination with the main structural panel (the stepped shoulders 28 of the complementary pressure blocks 24 acting as reactive surfaces with respect to such pressure). Simultaneously, the elevated temperatures of the cure process cause expansion of the pressure pad(s) 32 so that cure pressure is exerted against the legs of the "T" stiffening members (via the forming faces 26 of the complementary pressure blocks 24) for cure thereof. The finished composite article would comprise a main panel having "T" stiffening members integrally secured to only one side.

Figure 5:
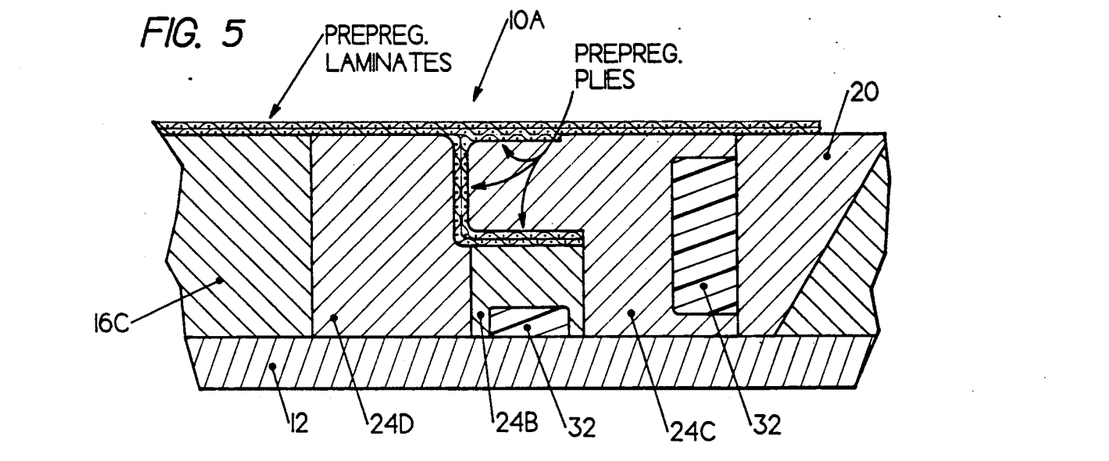
FIG. 5 illustrates another embodiment of a "T" mold assembly according to the present invention.
Figure 6:
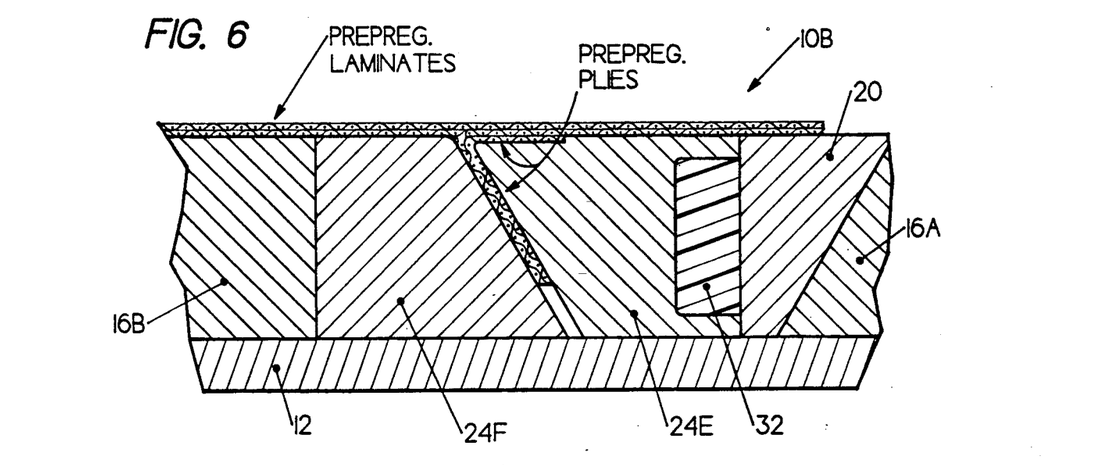
FIG. 6 illustrates a further embodiment of a "T" mold assembly according to the present invention.

Although the composite mold 10 according to the present invention has been described hereinabove in terms of fabricating composite articles having "T" stiffening members, the composite mold 10 of the present invention is not limited to the production of composite articles having "T" shaped stiffening members. To fabricate such composite articles utilizing the composite mold 10 of the present invention, the "T" mold assembly is modified as required, by fabricating appropriately shaped complementary pressure blocks having pressure pads to provide the necessary cure pressure, to conform to the desired configuration of the stiffening members. For example, composite molds 10A, 10B for the fabrication of "C" and "J" stiffening members are exemplarily illustrated in FIGS. 5, 6, respectively. The composite mold 10A embodiment of FIG. 5 includes three complementary pressure blocks 24B, 24C, 24D, two of which include pressure pads 32. The composite mold 10B embodiment of FIG. 6 includes two complementary pressure blocks 24E, 24F, only one of which includes a pressure pad 32.

A variety of modifications and variations of the present invention are possible in light of the above teachings. It is therefore to be understood that, within the scope of the appended claims, the present invention may be practiced otherwise than as specifically described hereinabove.

What is claimed is:

1. A composite mold for simultaneously co-curing at least one stiffening member formed of prepreg plies in combination with a main structural panel formed of prepreg laminates in a single cure process to form a composite article having the at least one stiffening member integrally bonded thereto, each at least one stiffening member having a leg and opposed flanges, comprising:
 a mold base;
 a stiffening member mold assembly mounted on said mold base, said stiffening member mold assembly including
  at least first and second complementary pressure blocks each having a forming face and a stepped shoulder for forming one stiffening member, said first and second complementary pressure blocks being mounted on said mold base with said forming faces and stepped shoulders thereof in opposed relation wherein prepreg plies layed up therebetween define the leg and opposed flanges of the one stiffening member, at least one of said first and second complementary pressure blocks having a pressure cavity formed therein, and
  a pressure pad formed from a thermally expansible material encapsulated in each said pressure cavity, each said pressure pad, pressure cavity combination being configured wherein each said pressure pad is operative to expand in volume to generate a predetermined pressure in response to elevated temperatures of the single cure process; and
 a rigid mold assembly disposed in combination with said mold base and said stiffening member mold assembly to define said composite mold, said rigid mold assembly including
  first and second members rigidly secured in combination with said mold base, said first member being disposed in abutting engagement with said first complementary pressure block and operative to act as a reactive surface therefor,
  a removable wedge member mounted on said mold base and disposed intermediate said second member and said second complementary pressure block in abutting engagement therewith, and
  end member means mounted on said mold base for facilitating assemblage of said stiffening member mold assembly in combination with said first member and said removable wedge member; exposed faces of aid stiffening member mold assembly and said rigid mold assembly distal said mold base providing a rigid lay-up surface for the prepreg laminates forming the main structural panel, the prepreg laminates contacting the prepreg plies forming the opposed flanges of the one stiffening member.

2. The composite mold of claim 1 wherein each said first and second complementary pressure blocks have a pressure cavity formed therein.

3. The composite mold of claim 1 wherein said forming faces of said first and second complementary pressure blocks are parallel and substantially perpendicular to said exposed face of said stiffening member mold assembly wherein the one stiffening member has a "T" configuration.

4. The composite mold of claim 1 wherein said forming faces of said first and second complementary pressure blocks are parallel and angled with respect to said exposed face of said stiffening member mold assembly wherein the one stiffening member has a "J" configuration.

5. The composite mold of claim 1 wherein said stiffening member mold assembly includes a third complementary pressure block mounted on said mold base, said third complementary pressure block having a pressure cavity formed therein adjacent said mold base and having a forming face in opposed distal relation to said pressure cavity.

6. The composite mold of claim 5 wherein said first, second, and third complementary blocks are disposed in combination so that the one stiffening member has a "C" configuration.

7. The composite mold of claim 1 wherein said stiffening mold assembly comprises a plurality of first and second complementary pressure blocks, each pair of first and second complementary pressure blocks being mounted on said mold base to define the leg and opposed flanges of one stiffening member.

* * * * *

UNITED STATES PATENT AND TRADEMARK OFFICE
CERTIFICATE OF CORRECTION

PATENT NO. : 5,190,773

DATED : March 2, 1993

INVENTOR(S) : Christopher J. Damon

It is certified that error appears in the above-identified patent and that said Letters Patent is hereby corrected as shown below:

Column 3, line 46, after "against" insert —respective leg surfaces of the corresponding "T"—.

Column 11, claim 1, line 3, "aid" should read —said—.

Signed and Sealed this

Ninth Day of May, 1995

Attest:

BRUCE LEHMAN

*Attesting Officer*     *Commissioner of Patents and Trademarks*